US008380977B2

(12) United States Patent
Son et al.

(10) Patent No.: US 8,380,977 B2
(45) Date of Patent: Feb. 19, 2013

(54) PEER-TO-PEER COMMUNICATION METHOD FOR NEAR FIELD COMMUNICATION

(75) Inventors: Jae-Seung Son, Suwon-si (KR); Eun-Tae Won, Seoul (KR); Jong-Hoon Ann, Suwon-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 980 days.

(21) Appl. No.: 11/704,085

(22) Filed: Feb. 7, 2007

(65) Prior Publication Data

US 2008/0065877 A1 Mar. 13, 2008

(30) Foreign Application Priority Data

Sep. 11, 2006 (KR) .................. 10-2006-0087545

(51) Int. Cl.
*H04L 29/06* (2006.01)
(52) U.S. Cl. ........................ 713/151; 380/270
(58) Field of Classification Search .................. 713/150, 713/151, 152, 168, 171
See application file for complete search history.

(56) References Cited

U.S. PATENT DOCUMENTS

| 6,389,008 B1 * | 5/2002 | Lupien et al. ................. 370/352 |
| 2009/0147803 A1 * | 6/2009 | Takayama .................... 370/475 |

FOREIGN PATENT DOCUMENTS

| KR | 2005-72607 | 7/2005 |
| KR | 2006-46577 | 5/2006 |
| WO | WO 2004/056006 | 7/2004 |
| WO | WO 2006/080436 | 8/2006 |

OTHER PUBLICATIONS

"Specification of the Bluetooth System, Core, v.1.1;" Bluetooth Sig, Inc., vol. 1; Feb. 22, 2001; XP002463181.
"Mifare DESFire; Contactless Multi-Application IC with DES and 3DES Security MF3 IC D40;" Product Short Form Specification. Philips Semiconductors; Apr. 2004; XP 002463182; Retrieved from internet (on Dec. 19, 2007): <http://www.nxp.com/acrobat_download/other/identification/SFS075530.pdf >.
Muller, Thomas; et al.; Patent Application No. US 2006/0143466 A1; Publication Date: Jun. 29, 2006; "Security Architecture;". . . .
Heung-Yeol Yeom; "Trend of Standardization of a Link Level Security Protocol;" Publication Date: Aug. 24, 2003.

* cited by examiner

*Primary Examiner* — Gilberto Barron, Jr.
*Assistant Examiner* — Simon Kanaan
(74) *Attorney, Agent, or Firm* — Cha & Reiter, LLC

(57) ABSTRACT

A peer-to-peer communication method for NFC is provided. A link-level security is started by exchanging a link-level security request and a link-level security response between an initiator terminal and a target terminal, then transmission data are encrypted at link-level security layers of the initiator terminal and the target terminal, and the encrypted data are exchanged between the initiator terminal and the target terminal. The link-level security is released by exchanging a link-level security release request and a link-level security release response between the initiator terminal and the target terminal.

11 Claims, 3 Drawing Sheets

PEER-TO-PEER COMMUNICATION METHOD FOR NEAR FIELD COMMUNICATION

CLAIM OF PRIORITY

This application claims priority under 35 U.S.C. §119 to an application entitled "Peer-to-Peer Communication Method for Near Field Communication," filed in the Korean Intellectual Property Office on Sep. 11, 2006 and assigned Serial No. 2006-87545, the contents of which are herein incorporated by reference.

BACKGROUND OF THE INVENTION

1. Field of the Invention

The present invention relates generally to Near Field Communication (NFC) and, in particular, a peer-to-peer communication method for Near Field Communication (NFC) to provide the required link-level security to an NFC terminal during peer-to-peer communication.

2. Description of the Related Art

NFC technology evolved from a combination of contactless identification (RFID) and interconnection technologies. It integrates a contactless reader, a contactless card, and a peer-to-peer function on a single chip and operates in the 13.56 MHz frequency range, over a distance of typically a few centimeters. NFC technology is standardized in International Standard Organization/International Electrotechnical Commission (ISO/IEC) 18092, ISO/IEC 21481, European Computer Manufacturers Association (ECMA) 340, 352 and 356, and European Telecommunication Standards Institute (ETSI) TS 102 190. NFC is also compatible with ISO/IEC 14443A-based contactless smart card infrastructure, i.e. Phillips MIRAFE® technology as well as Sony's Felica card.

NFC peer-to-peer communication provides a communication channel between NFC-enabled devices to exchange data in a point-to-point communication manner. That is, the devices exchange data on an equal basis without complex setting.

FIG. 1 illustrates a conventional NFC protocol stack. As shown, a Radio Frequency (RD) layer 100 is the lowest layer and complies with ISO/IEC 18092 and 14443B for NFC. The RF layer 100 corresponds to a physical layer in an Open Systems Interconnection (OSI) reference model and performs data modulation and demodulation as well as radio transmission. A Logical Link Control Protocol (LLCP) layer 110 is responsible for link management, segmentation and reassembly, and connectivity to a plurality of upper-layer protocols. An existing stack layer 120 refers to a variety of existing transport layers including, for example, Transmission Control Protocol/Internet Protocol (TCP/IP) and Object Exchange (OBEX). An NFC Data Exchange Format (NDEF) layer 130 defines a common data format for NFC Forum-compliant devices and NFC Forum-compliant tags. An application layer 140 refers to general execution programs.

FIG. 2 is a diagram illustrating an exemplary signal flow for a conventional message exchange procedure for NFC peer-to-peer communication, particularly a process for providing security functionality. Referring to FIG. 2, an initiator terminal 200 and a target terminal 210 are shown as NFC Forum-compliant devices. The initiator terminal 200 initiates a peer-to-peer communication, and the target terminal 210 is the receiving party of the peer-to-peer communication.

Both the initiator terminal 200 and the target terminal 210 have the protocol stack architecture illustrated in FIG. 1. Hence they have their respective application layers 201 and 211. After setup of the peer-to-peer communication, the initiator terminal 200 exchanges data with the target terminal 210 at the application layers 201 and 211 without a link-level security in step 220. If the application layers 201 and 211 provide the application-level security, key generation and exchange are performed through a security manager (not shown).

Examples of the NFC technology illustrated in FIGS. 1 and 2 are found in Korea Patent Application No. 2005-7010453 entitled "Communication System, Communication Apparatus and Communication Method" filed on Jun. 9, 2005 (US2006-6245402, PCT/JP03/15646).

However, the conventional NFC peer-to-peer communication illustrated in FIGS. 1 and 2 does not provide a link-level security for protecting the exchanged data. Therefore, confidential user data cannot be protected with the link-level security. Although an upper-layer protocol may provide the security functionality, a higher-level security requires the link-level security functionality that encrypts data at a data link layer (an OSI reference model) for transmission.

SUMMARY OF THE INVENTION

The present invention substantially solves at least the above problems and/or disadvantages and provides additional advantages, by providing an NFC peer-to-peer communication method for providing a stricter security.

One aspect of the present invention is to provide an NFC peer-to-peer communication method for supporting a link-level security.

According to another aspect of the present invention, in a peer-to-peer communication method for NFC, a link-level security is started by exchanging a link-level security request and a link-level security response between an initiator terminal and a target terminal. Transmission data are encrypted at link-level security layers of the initiator terminal and the target terminal, and the encrypted data are exchanged between the initiator terminal and the target terminal. The link-level security is released by exchanging a link-level security release request and a link-level security release response between the initiator terminal and the target terminal.

BRIEF DESCRIPTION OF THE DRAWINGS

The above features and advantages of the present invention will become more apparent from the following detailed description when taken in conjunction with the accompanying drawings in which.

DETAILED DESCRIPTION OF THE EXEMPLARY EMBODIMENTS

Hereinafter, embodiments of the present invention will be described herein below with reference to the accompanying drawings. For the purposes of clarity and simplicity, well-known functions or constructions are not described in detail as they would obscure the invention in unnecessary detail.

Figure 1:
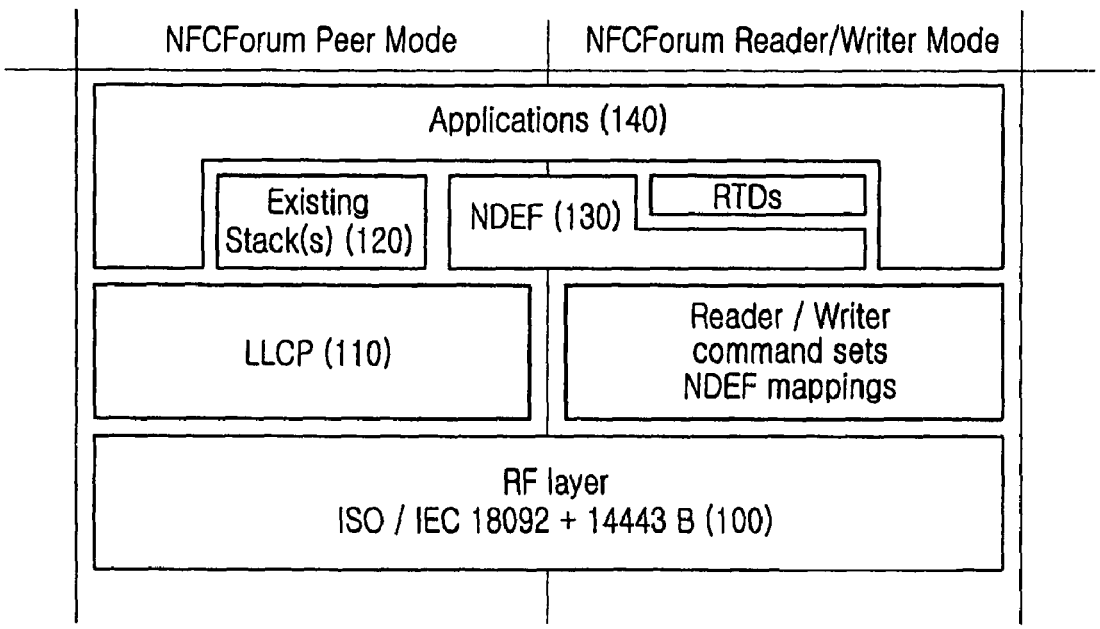
FIG. 1 illustrates a conventional NFC protocol stack architecture.
Figure 2:
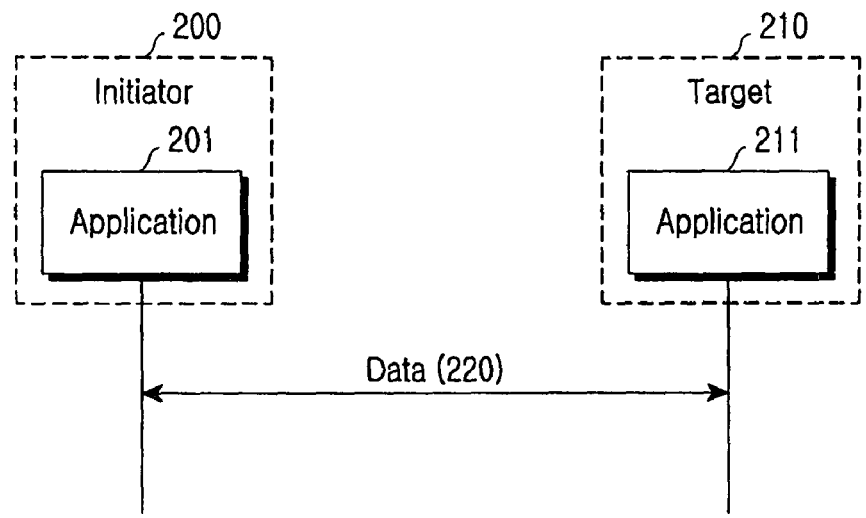
FIG. 2 is a diagram illustrating an exemplary signal flow for a conventional message exchange procedure for NFC peer-to-peer communication.
Figure 3:
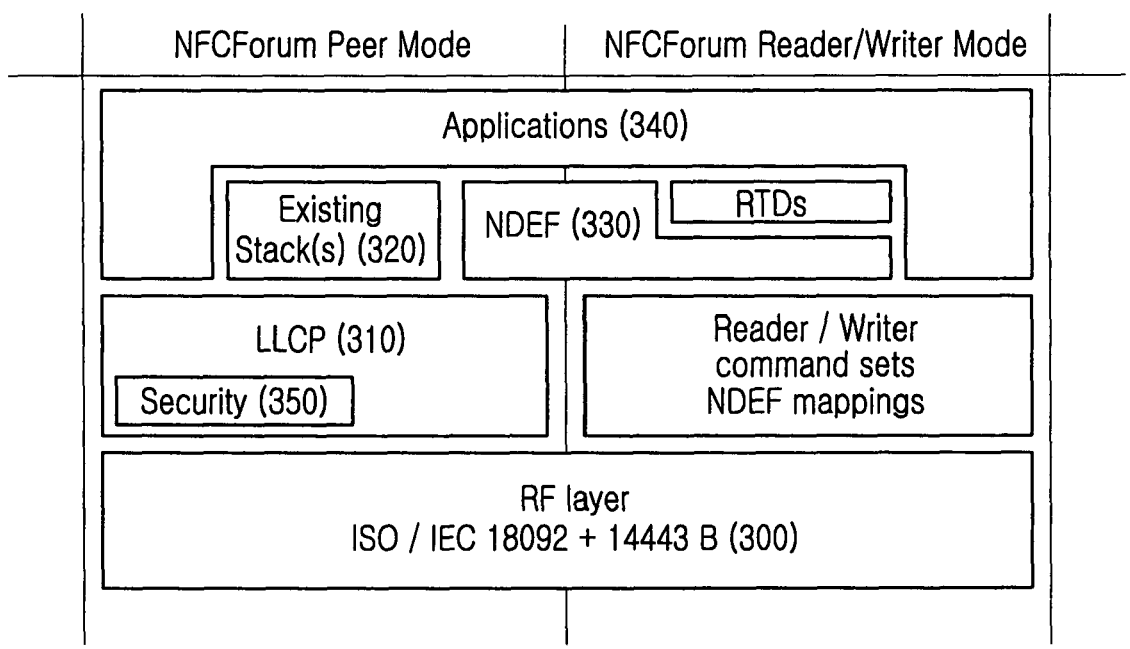
FIG. 3 illustrates an NFC protocol stack architecture according to an embodiment of the present invention.

FIG. 3 illustrates an NFC protocol stack architecture according to an embodiment of the present invention. As shown, an RF layer 300 is the lowest layer of the protocol stack in compliance with ISO/IEC 18092 and 14443B. The RF layer 300, which corresponds to the physical layer of the OSI reference model, performs data modulation and demodulation, and radio transmission. An LLCP layer 310 is responsible for link management, segmentation and reassembly, and connectivity to a plurality of upper-layer protocols. An existing stack layer 320 refers to a variety of existing transport layers including, for example, TCP/IP and OBEX. An NDEF layer 330 defines a common data format for NFC Forum-compliant devices and NFC Forum-compliant tags. An application layer 340 refers to general execution programs. A security layer 350 is a sub-layer of the LLCP layer 310 and functions to notify the start and end of key exchange and encryption. The function and operation of the security layer 350 will be described in great detail with reference to FIG. 4.

Figure 4:
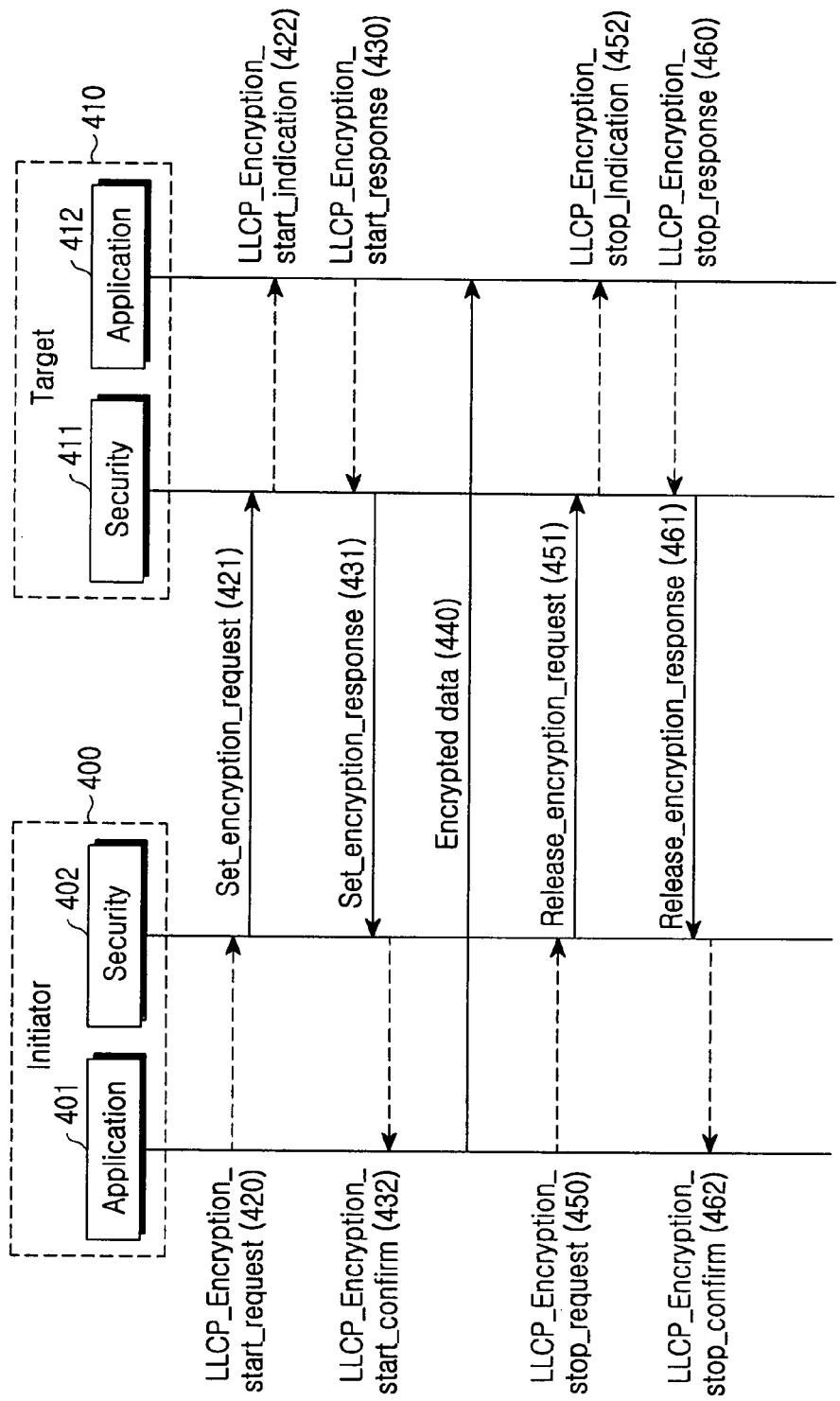
FIG. 4 is a diagram illustrating a signal flow for a message exchange procedure for NFC peer-to-peer communication according to an embodiment of the present invention.

FIG. 4 is a diagram illustrating a signal flow for a message exchange procedure for NFC peer-to-peer communication according to an embodiment of the present invention. An initiator terminal 400, a target terminal 410 and their application layers 401 and 411 are the same in definition and function as the initiator terminal 200, the target terminal 210, and their application layers 201 and 211.

According to the present invention, the initiator terminal 400 and the target terminal 410 include their respective security layers 402 and 411. When link-level security is applied, the security layers 402 and 411 function to exchange messages between the initiator terminal 400 and the target terminal 410 and to receive an associated primitive from an upper layer, and then execute a command corresponding to the primitive.

Referring to FIG. 4, when an application program associated with a peer-to-peer communication is executed, a user may request a link-level security for the application program through a User Interface (UI) according to the present invention. Alternatively, the user may beforehand decide as to whether to perform the link-level security function for each mode or step so that link-level security is provided to each application program in a corresponding mode.

When the user intends to apply link-level security to a particular application program, the application layer 401 of the initiator terminal 400 sends an LLCP_Encryption_start_request command requesting the start of the link-level security function to the security layer 402, in step 420. The LLCP_Encryption_start_request message contains information indicating whether the initiator terminal 400 uses the link-level security (InitiatorSecurityCapability) and the Identifier (ID) of the application program for which the link-level security (Application_id) is supported.

In step 421, the security layer 402 of the initiator terminal 400 sends a Set_encryption_request message requesting a security setup to the security layer 411 of the target terminal 410. The Set_encryption_request message notifies the target terminal 410 that the initiator terminal 400 requests the link-level security, and delivers the ID of the application program and a random variable for use in generating an encryption key, as illustrated in Table 1 below.

TABLE 1

InitiatorSecurityCapability
Application_id
EN_RAND

InitiatorSecurityCapability tells that the initiator terminal 400 requests the link-level security. Application_id is the ID of the application program to which the link-level security is to be applied. The ID of the application program can be a conventional one such as Application Family Identifier (AFI) defined by ISO/IEC 14443 or a new one. EN_RAND is a random variable used for generation of an encryption key. The target terminal 410 processes EN_RAND based on information that it preserves. Alternatively, it may combine EN_RAND with information acquired by a different NFC identification and authentication scheme. The initiator terminal 400 creates EN_RAND based on information that it has, or by a different NFC identification and authentication scheme.

After step 421, the security layer 411 of the target terminal 410 sends an LLCP_Encryption_start_indication command requesting the start of the link-level security function to the application layer 412 in step 422. The LLCP_Encryption_start_indication command contains information indicating whether the initiator terminal uses security (InitiatorSecurityCapability) and the ID of the application program needing the link-level security (Application_id).

The application layer 412 of the target terminal 410 sends an LLCP_Encryption_start_response command for the link-level security start request to the security layer 411 in step 430. The LLCP_Encryption_start_response command indicates whether the initiator terminal uses security, provides the ID of the application program using the link-level security, and indicates whether the target terminal uses security, as illustrated in Table 2 below.

TABLE 2

InitiatorSecurityCapability
Application_id
TargetSecurityCapability
EN_RAND

InitiatorSecurityCapability tells that the initiator terminal 400 uses the link-level security. Application_id is the ID of the application program to which the link-level security is to be applied. TargetSecurityCapability tells that the target terminal 410 intends to use the link-level security or indicates whether the target terminal 410 can support the link-level security. EN_RAND is a random variable used for generation of an encryption key. The initiator terminal 400 processes EN_RAND based on information that it preserves. Alternatively, it may combine EN_RAND with information acquired by a different NFC identification and authentication scheme. The target terminal 410 creates EN_RAND based on information that it has, or by a different NFC identification and authentication scheme.

The security layer 402 of the initiator terminal 400 sends an LLCP_Encryption_start_confirm command to the application layer 401, confirming the start of the link-level security in step 432. The LLCP_Encryption_start_confirm command contains information indicating whether the initiator terminal 400 uses security (InitiatorSecurityCapability), the ID of the application program using the link-level security (Application_id), and information indicating whether the target terminal uses security (TargetSecurityCapability).

Thus, the initiator terminal 400 and the target terminal 410 are now capable of encrypting transmission data with an encryption key created using the random number from the other party in the security layers 402 and 411. In step 440, the encrypted data is transmitted.

Later, when the initiator terminal 400 wants to release the link-level security, the application layer 401 of the initiator terminal 400 sends an LLCP_Encryption_stop_request command to the security layer 420 in step 450. The LLCP_Encryption_stop_request command contains InitiatorSecurityCapability indicating whether the initiator terminal uses the security and Application_id indicating the ID of the application program using the link-level security.

In step 451, the security layer 402 of the initiator terminal 400 sends a Release_encryption_request message to the security layer 411 of the target terminal 410, requesting the release of the security. The Release_encryption_request message carries that the link-level request security release from the initiator terminal 400 to the target terminal 410. The Release_encryption_request message contains the following information.

TABLE 3

| InitiatorSecurityCapability |
|---|
| Application_id |

InitiatorSecurityCapability indicates whether the initiator terminal 400 uses the link-level security. Application_id is the ID of the application program from which the link-level security is to be released. Note that how IDs are given to application programs has been described earlier, thus omitted to avoid redundancy.

In step 452, the security layer 411 of the target terminal 410 sends an LLCP_Encryption_stop_indication message to the application layer 412, commanding the release of the link-level security. The LLCP_Encryption_stop_indication message includes InitiatorSecurityCapability indicating whether the initiator terminal uses the security and Application_id indicating the ID of the application program using the link-level security.

The application layer 412 of the target terminal 410 sends an LLCP_Encryption_stop_response message to the security layer 411. The LLCP_Encryption_stop_response message includes InitiatorSecurityCapability indicating whether the initiator terminal uses the security, Application_id indicating the ID of the application program using the link-level security, and TargetSecurityCapability indicating whether the target terminal uses the security.

The target terminal 410 sends a Release_encryption_response message to the initiator terminal 400, in step 461. The Release_encryption_response includes the following information illustrated in Table 4 below.

TABLE 4

| TargetSecurityCapability |
|---|
| Application_id |

TargetSecurityCapability tells that the target terminal 410 will release the link-level security, and Application_id is the ID of the application program from which the link-level security is to be released.

The security layer 402 of the initiator terminal 400 sends an LLCP_Encryption_stop_confirm message to the application layer 401, confirming the security release in step 462. The LLCP_Encryption_stop_confirm message includes InitiatorSecurityCapability indicating whether the initiator terminal uses the security, Application_id indicating the ID of the application program using the link-level security, and TargetSecurityCapability indicating whether the target terminal uses the security.

As described above, the Near Field Communication (NFC) peer-to-peer communication method of the present invention supports link-level security. The resulting provisioning of stricter security services to users enables more reliable NFC.

While the invention has been shown and described with reference to certain preferred embodiments thereof, they are merely exemplary applications. For example, while it has been described that the link-level security function is invoked when the user wants to apply the link-level security to an application program, this operation may be performed at an early stage of communications between the initiator terminal and the target terminal and also, when particular data requires security during data communications without the link-level security. Also, encryption setup may take place between the initiator terminal and the target terminal when communications initially starts and the encryption setup may be changed during communications. Thus, it will be understood by those skilled in the art that various changes in form and details may be made therein without departing from the spirit and scope of the invention as defined by the appended claims.

What is claimed is:

1. A peer-to-peer communication method for Near Field Communication (NFC), comprising the steps of:
    predetermining by a user whether to provide link level security for each node transmitting in NFC;
    setting a link-level security for each application program to be communicated via peer-to-peer communication by a user of an initiator terminal that communicates via NFC;
    transmitting a link-level security request to a target terminal that communicates via NFC to start a link-level security for encryption and decryption at a data link layer of an Open Systems Interconnection (OSI) protocol by the initiator terminal, and receiving a link-level security response from the target terminal via NFC;
    encrypting transmission data using the set link-level security for an application program corresponding to the transmission data at link-level security layers of the initiator terminal, and transmitting the encrypted data to the target terminal by the initiator terminal;
    transmitting the link-level security release request to the target terminal to release link-level security by the initiator terminal, and receiving the link-level security release response from the target terminal;
    wherein each of the initiator terminal and the target terminal has an NFC protocol stack, the NFC protocol stack comprising a Logical Link Control Protocol (LLCP) layer for link management, segmentation and reassembly, and connectivity to a plurality of upper-layer protocols, and a security layer being a sub-layer of the LLCP layer, for notifying starting and releasing via NFC a key exchange and encryption to provide the link-level security.

2. The peer-to-peer communication method of claim 1, wherein the step of transmitting a link-level security request comprises the step of starting the link-level security according to a preset user selection as to determine whether the link-level security is to be performed for an application program associated with NFC when the application program is executed.

3. The peer-to-peer communication method of claim 1, wherein the step of transmitting a link-level security request comprises the step of exchanging random variables during exchanging the link-level security request and the link-level security response.

4. The peer-to-peer communication method of claim 3, wherein the step of encrypting transmission data comprises the step of encrypting the transmission data with encryption keys created by the random variables.

5. The peer-to-peer communication method of claim 1, wherein the step of transmitting a link-level security request comprises the step of starting the link-level security when communications start between the initiator terminal and the target terminal or during the communications.

6. The peer-to-peer communication method of claim 1, wherein the step of transmitting a link-level security request comprises the steps of:
   sending a command requesting starting of the link-level security to the security layer of the initiator terminal by an application layer of the initiator terminal; and
   sending a message requesting security setup to the security layer of the target terminal by the security layer of the initiator terminal,
   wherein the security setup requesting message includes the Identifier (ID) of the application program requesting the link-level security and a random variable for creating an encryption key.

7. The peer-to-peer communication method of claim 1, wherein the step of transmitting the link-level security release request comprises the steps of:
   sending a command requesting the release of the link-level security to the security layer of the initiator terminal by the application layer of the initiator terminal; and
   sending a message requesting the release of the link-level security to the security layer of the target terminal by the security layer of the initiator terminal,
   wherein the message requesting the release of the link-level security includes the Identifier (ID) of the application program from which the link-level security is to be released.

8. A peer-to-peer communication method for Near Field Communication (NFC), comprising the steps of:
   predetermining by a user whether to provide link level security for each node transmitting in NFC;
   receiving a link-level security request for encryption and decryption at a data link layer of an Open Systems Interconnection (OSI) protocol from an initiator terminal by a target terminal via NFC, and responding to the initiator terminal for the link-level security request by the target terminal;
   receiving transmission data encrypted at the security layer of the initiator terminal from the initiator terminal via NFC;
   receiving the link-level security release request from the initiator terminal to release link-level security by the target terminal, and responding to the initiator terminal for the link-level security release request by the target terminal;
   wherein each of the initiator terminal and the target terminal has an NFC protocol stack, the NFC protocol stack comprising a Logical Link Control Protocol (LLCP) layer for link management, segmentation and reassembly, and connectivity to a plurality of upper-layer protocols, and a security layer being a sub-layer of the LLCP layer for NFC transmissions, for notifying starting and releasing of key exchange and encryption to provide the link-level security wherein the initiator terminal provides the link-level security via NFC for each application program of the plurality of application programs set by a user of the initiator terminal.

9. The peer-to-peer communication method of claim 8, wherein the step of responding to the initiator terminal comprises the steps of:
   sending a commanding requesting starting of the link-level security to an application layer of the target terminal by the security layer of the target terminal;
   sending a response command for the link-level security starting request to the security layer of the target terminal by the application layer of the target terminal; and
   sending a response message for the security setup request of the initiator terminal to the initiator terminal by the security layer of the target terminal,
   wherein the response message for the security setup request includes an indicator indicating that the target terminal uses the link-level security and a random variable for creating an encryption key.

10. The peer-to-peer communication method of claim 9, wherein the step of receiving transmission data encrypted at the security layer of the initiator terminal comprises the step of encrypting the transmission data with an encryption key created using the random variable received from the target terminal at the security layer of the initiator terminal and receiving the encrypted data from the initiator terminal by the target terminal.

11. The peer-to-peer communication method of claim 8, wherein the step of receiving the link-level security release request from the initiator terminal to release link-level security by the target terminal, and responding to the initiator terminal for the link-level security release request by the target terminal comprises the steps of:
   sending a command requesting the release of the link-level security to the application layer of the target terminal by the security layer of the target terminal;
   sending a response for the link-level security release request to the security layer of the target terminal by the application layer of the target terminal; and
   sending a response message for the link-level security release request of the initiator terminal to the initiator terminal by the security layer of the target terminal.

\* \* \* \* \*